M. Gregg,
Hollow Auger.
Nº 1895.      Patented Dec. 10, 1840.
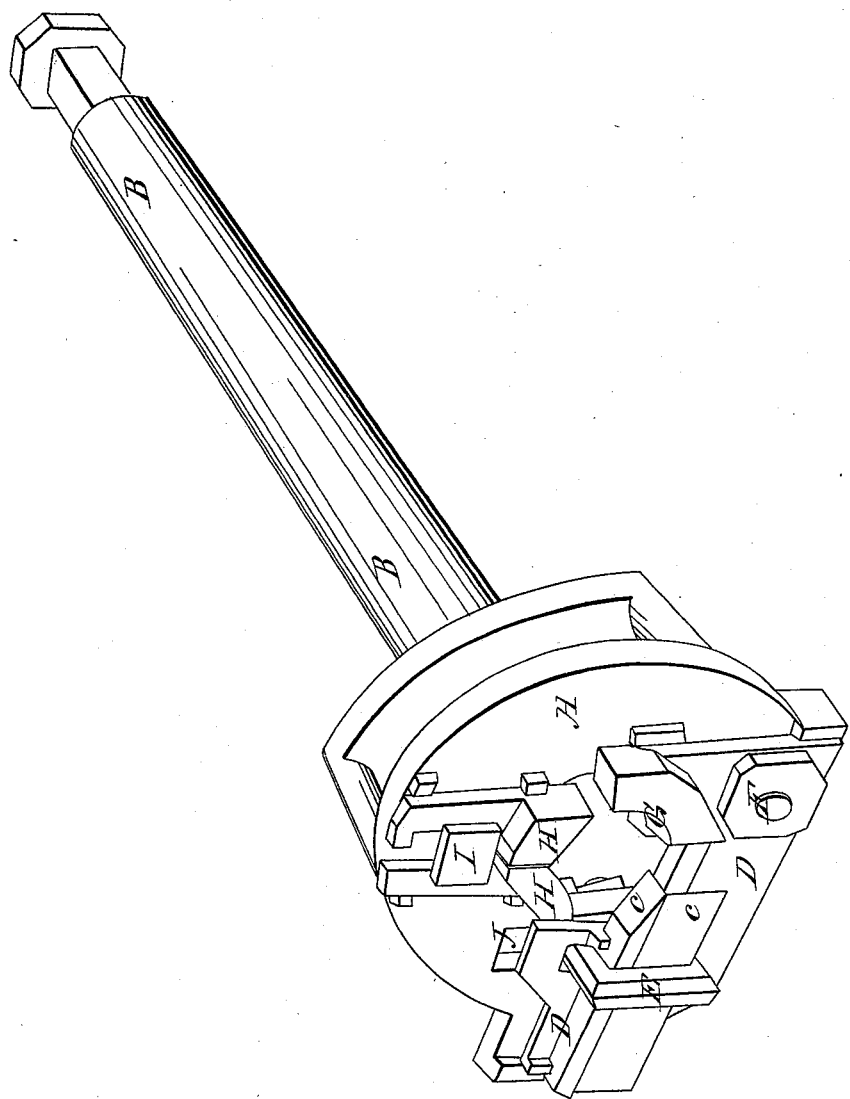

UNITED STATES PATENT OFFICE.

MAHLON GREGG, OF PHILADELPHIA, PENNSYLVANIA.

MACHINE FOR CUTTING ROUND TENONS AND FOR CUTTING OR TURNING OTHER ARTICLES OF WOOD INTO A CYLINDRICAL FORM.

Specification of Letters Patent No. 1,895, dated December 10, 1840.

*To all whom it may concern:*

Be it known that I, MAHLON GREGG, of the city of Philadelphia, in the State of Pennsylvania, have made certain Improvements in Machines for the Cutting of Round Tenons and for the Turning or Cutting of Various Articles from Wood into a Cylindrical Form; and I do hereby declare that the following is a full and exact description thereof.

I am well aware that hollow augers, and other tools of a like character have been made and used for cutting round tenons, and for other purposes analogous thereto, and of course, I do not claim to be the inventor of such tools generally, they having been long known; but I have made such improvements in instruments of this kind as render them more generally useful, my improved instrument being easily kept in order by grinding and setting instead of by filing; and being also readily adjusted so as to cut round tenons, or other cylindrical articles, of different sizes, by the same machine.

In the accompanying drawing, A, is the face plate of my tenon cutter, upon which face plate the adjustable cutters and gage pieces are held by means of screws and nuts. This face plate is attached to a mandrel, or spindle, B, B, which may be made to revolve like the mandrel of a lathe, or in any other manner by which it may be best adapted to the purpose to which it is to be applied.

C, C′, are the cutters, which I make in two pieces, nicely fitted to each other so that when placed together their cutting edges shall stand at right angles, or at any preferred angle, to each other, and so that in their combined capacity they shall form a right, or other angled, cutter, while their parts when separated may be ground and set like an ordinary chisel. These cutters lie upon a secondary plate D, D, which is itself adjustable on the face plate A. The cutters are held by means of a clip, or staple, E, through which they pass, and which is secured on the back of the face plate by a screw nut, the shank of which passes through a slot J, in the face plate. The screw bolt F, fastens the other end of the secondary plate, its shank also passing through a slot in the face plate, or in the secondary plate, by which provision the secondary plate may be moved nearer to, or farther from, the center of the face plate. The part G, of this plate operates as an adjusting guide, its inner angle always standing in a line with that of the cutter.

H, H, are adjustable guide pieces, held in place by the screw bolt I; it will be seen that by this provision the size of the tenon, or cylinder, to be cut can be readily determined.

When the purpose to which this machine is to be applied requires it, the mandrel, or spindle, B, may be made hollow, so that an article of any desired length may pass through it.

Having thus, fully described the manner in which I construct my machine, and shown how the same is to be used, what I claim therein as constituting my improvement, and desire to secure by Letters Patent, is—

The manner in which I have combined and arranged the face plate and the adjustable cutters and guide pieces, so as to adapt the machine to the cutting of tenons and cylinders of different sizes, the whole operating substantially as herein set forth.

MAHLON GREGG.

Witnesses:
WILLIAM GREGG,
ISAAC BARTON.